SIGNAL RESPONSIVE RECEIVER

Filed Feb. 14, 1948 2 SHEETS—SHEET 1

INVENTOR
GEORGE D. HANCHETT, JR
BY Samuel B. Smith
ATTORNEY

INVENTOR
GEORGE D. HANCHETT, JR.
BY Samuel B. Smith
ATTORNEY

Patented Sept. 9, 1952 2,610,293

UNITED STATES PATENT OFFICE 2,610,293

SIGNAL RESPONSIVE RECEIVER

George D. Hanchett, Jr., Millburn, N. J., assignor to Radio Corporation of America, a corporation of Delaware Application February 14, 1948, Serial No. 8,338

16 Claims. (Cl. 250—20)

My invention relates to receivers and more particularly to receivers which respond to a signal by becoming operative in the presence thereof. In connection with this application, attention is directed to my co-pending application, Serial No. 769,600, filed August 20, 1947.

It is often desirable that a radio receiver respond to an incoming radio frequency signal to which it is tuned, and that it be muted in the absence of a signal, thereby to avoid undesirable noise when no signal is being received. Again, it is often desirable in communication systems that a receiver be operative at the option of a central station which may selectively transmit to a desired receiver station by utilizing a selective tone control signal. Each selected receiver station becomes operative in response to the tone control signal and is non-operative until such signal is transmitted. Heretofore, such systems which become operative in response to an incoming radio frequency signal have been characterized by an undesirable lack of sensitivity in the neighborhood of the threshold signal value. Moreover, receivers of both types, that is, those which respond to an incoming radio frequency signal or those which respond to a desired selective tone control signal, often fail to have a definite "on-off" control, and in addition often are characterized when muted by undesirable power dissipation in the audio amplifier or final stage.

It is an object of my invention to provide means for making a receiver operative in response to a signal.

It is another object of the invention to provide means for making a receiver operative in response to a signal and inoperative in the absence of a signal.

It is another object of the invention to provide means for making a receiver operative in response to a selective tone control signal.

It is a further object of the invention to provide the means above described which are definite in response, economical in operation, and which do not materially adversely affect the fidelity and sensitivity of the receiver in which they are employed.

In accordance with the present invention a tube of an electronic trip circuit is inserted in series with the direct current supply of an amplifier tube. The trip circuit is responsive to a voltage derived from the signal voltage, and when tripped in response to the derived voltage, the direct current voltage supply is made available to the amplifier tube. I prefer to use a grid controlled gas discharge tube in the trip circuit connected in series with the direct current supply so that the amplifier tube current, or the major portion thereof, is drawn through the gas tube, as will appear more fully hereinafter. I have found that a gas discharge tube is particularly desirable and peculiarly well fitted for the purpose, although other tubes may be used.

Other objects, advantages and novel features of my invention will become apparent from the following description and the accompanying drawing, in which.

Figures 3, 4:
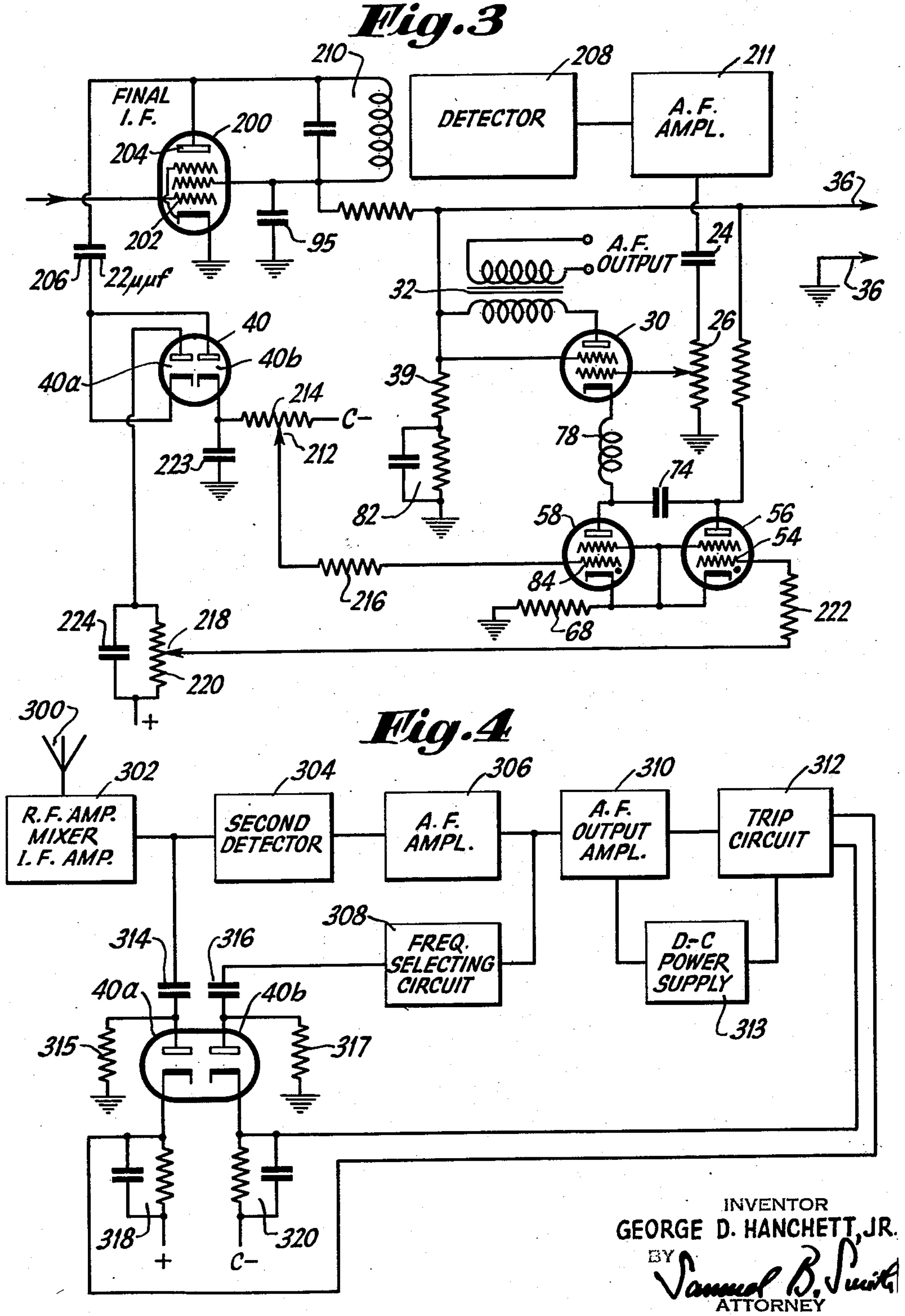

Fig. 3 is a circuit diagram, partially in block diagram form, of an amplitude modulation receiver or a frequency modulation receiver which becomes operative on receiving a signal and muted in the absence thereof; and Fig. 4 is a similar circuit diagram illustrating the invention in connection with an amplitude modulation receiver or a frequency modulation receiver employing a ratio detector and which becomes operative in response to a selective tone control signal.

Figures 1, 2:
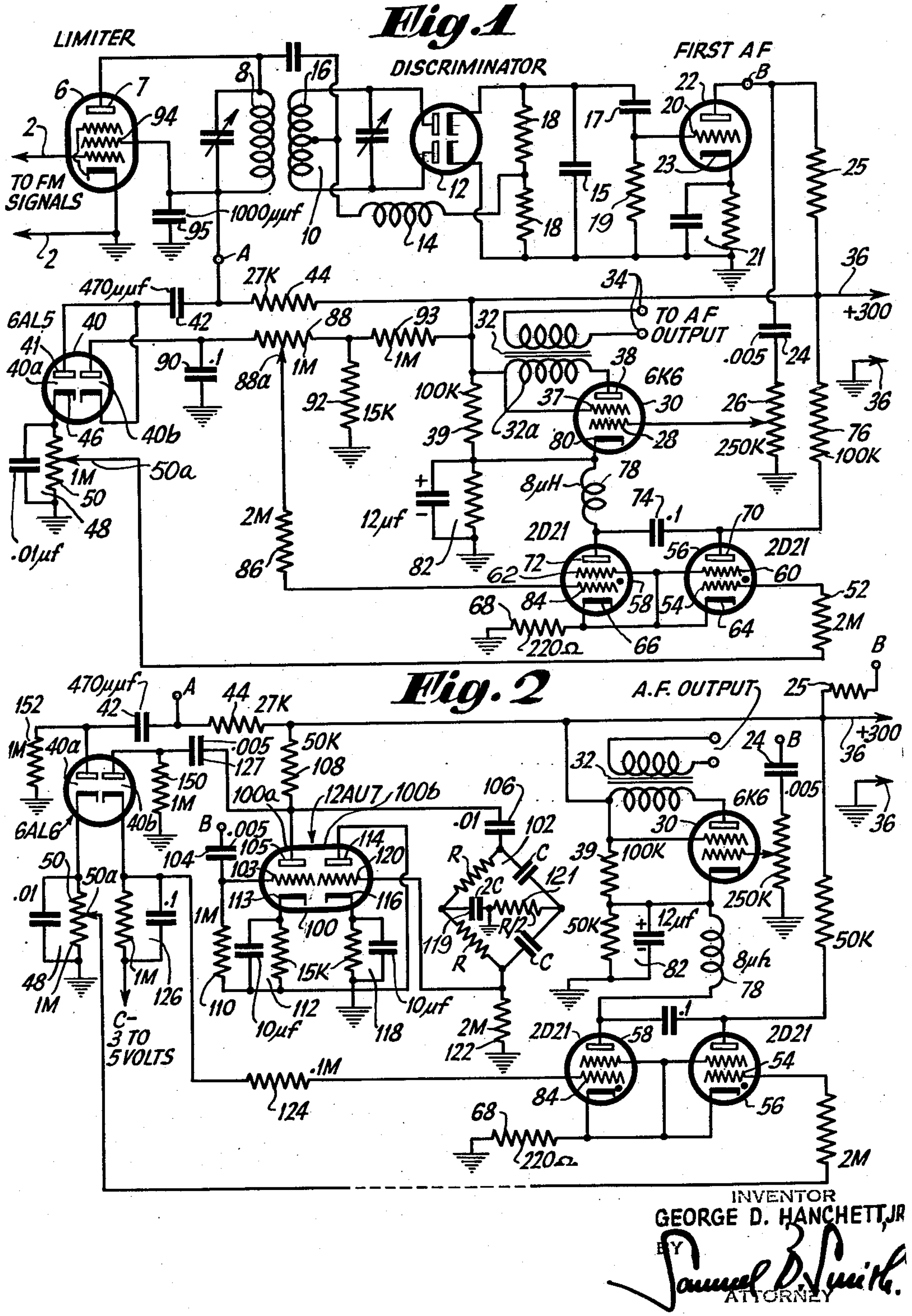
Fig. 1 is a circuit diagram of one embodiment of my invention, in which a receiver becomes operative in response to a signal and is inoperative in the absence of a signal.
Fig. 2 is another embodiment of my invention suitable for employment in a selective tone control signal system, omitting certain circuit portions sufficiently illustrated in Fig. 1.

Referring more particularly to Fig. 1, the circuit diagram is that of a portion of a frequency modulation receiver incorporating my invention and comprising the limiter and discriminator stages, the first audio frequency stage, and the audio frequency output stage. The frequency modulated signals appear across the conductor 2, one of which is connected to a conductor designated as the conventional ground. The signals are thus fed to the grid 4 of limiter tube 6. Screen grid 94 is connected to ground through condenser 95. The amplitude limited signal appearing at the plate 7 is fed to the coupled resonant circuits 8, 10 and thence to discriminator tube 12. Inductance 14 is connected between the center tap of the inductance 16 of tuned circuit 10 and the junction between resistors 18. Condenser 15 is connected across resistors 18. The circuit comprising the two tuned circuits 8, 10, discriminator 12, inductance 14, resistors 18, and condenser 15 form a conventional discriminator circuit for frequency modulated signals.

The demodulated signal, or audio signal, as it may be termed, appears across resistor 18 and is fed through the condenser 17 to the grid 20 of tube 22 in the first audio frequency stage. Resistor 19 serves as grid resistor for tube 20. Resistor-condenser combination 21 is connected from ground to cathode 23 of tube 22 to afford a proper bias for the tube. The output of tube 22 appearing across plate resistor 25 is supplied through condenser 24 and potentiometer 26 to the grid 28 of tube 30. After amplification in tube 30 the audio frequency signals are supplied by transformer 32 to output terminals 34 which may lead to the voice coil of a loudspeaker. Plate voltage is supplied to the tube 30 from any conventional power supply (indicated, but not shown) through conductors 36, one of which is grounded, and reaches the plate 38 of tube 30 through primary 32*a* of transformer 32. Screen grid 37 of tube 30 is connected directly to the positive terminal of the power supply and through resistor 39 to cathode 80 of tube 30. Plate voltage is supplied to plate 7 of limiter tube 6 from the power supply through a voltage dropping resistor 44 and the inductance of tuned circuit 8, and to the plate of tube 22 through the plate load resistor 25. The double diode 40 has the plate 41 of one section 40*a* thereof connected to the bottom of tuned circuit 8 through condenser 42. Cathode 46 of section 40*a* of the double diode is connected to a parallel resistor-condenser combination 48, the other side of which is connected to ground. A tap 50*a* from resistor 50 of resistor-condenser combination 48 leads through a resistor 52 to the grid 54 of a gas discharge tube 56.

Another gas discharge tube 58 is connected in trip circuit arrangement with gas tube 56. The screen grids 60 and 62 of tubes 56 and 58, respectively, are connected together to the cathodes 64 and 66. The common junction of these screens and cathodes is connected to ground through a resistor 68. The plates 70 and 72 of tubes 56 and 58, respectively, are connected together by a condenser 74. Plate 70 is connected through resistor 76 to the positive terminal of the voltage supply. Plate 72 of tube 58 is connected through an inductance 78 to the cathode 80 of tube 30, and cathode 80 is also connected to a parallel resistor-condenser combination 82, the other side of which is connected to ground. Control grid 84 of tube 58 is connected through a resistor 86 to the tap 88*a* of a potentiometer 88. The other section 40*b* of tube 40 has its cathode connected directly to the plate 41 of section 40*a*. The plate of section 40*b* is connected to one side of potentiometer 88 and also to ground through a condenser 90. The other side of potentiometer 88 is connected to ground through resistor 92. The junction of potentiometer 88 and resistor 92 is connected to the positive side of the power supply through resistor 93.

The operation of the circuit of Fig. 1 is such that with no signal appearing on conductors 2, tube 30 is non-conductive. In the absence of a frequency modulation signal on conductors 2, a certain amount of random noise due largely to amplitude modulation is generated on screen grid 94 which is connected to ground through condenser 95. A portion of the noise signal passes through condenser 42 and is rectified by diode 40, thereby providing a certain positive bias for the control grid 54 of gas tube 56 and a certain negative bias for control grid 84 of tube 58. These bias voltages are sufficient to cause tube 58 to remain non-conductive and tube 56 to remain conductive. When a strong enough frequency modulation signal is received on terminals 2 to cause tube 6 to perform its limiting action, the random noise signals generated on screen grid 94 do not appear, or are substantially reduced, because there is then substantially no amplitude modulation of the cathode current of tube 6. Consequently, little or no signal is fed through condenser 42, and the grid 54 of tube 56 is reduced in voltage and the grid 84 of tube 58 is increased in voltage. Because of the cathode coupling between these two tubes, one tube only conducts to the exclusion of the other. Because of the voltage changes, tube 58 is fired by the voltage on grid 84 and becomes conductive and tube 56 becomes non-conductive. Condenser 74 then feeds a negative impulse to plate 70 to aid in de-ionization and the quenching or suppression of current in tube 56. Inductance 78 prevents a short-circuit of this negative impulse through the condenser of combination 82 to ground. During the conduction of tube 56 current flows therethrough to the power supply through resistor 76. However, during the conduction of tube 58, current passes through inductance 78 and tube 30. Tube 58 is in series with the power supply and tube 30. Thus tube 30 and, consequently, the receiver is inoperative unless tube 58 is conductive.

Upon the termination of signals sufficient to drive limiter tube 6 to limiter values, the noise signals return to tube 40, the initial bias conditions are restored, tube 56 is fired by the positive voltage on grid 54 and becomes conductive to the exclusion of tube 58, condenser 74 now serving to feed a negative quenching impulse to the plate of tube 58. The circuit comprising resistor 39 and resistor-condenser combination 82 serves as a voltage divider to fix the potential of cathode 80 at a desired point, in this case about 100 volts above ground, when tube 58 is non-conductive. Tube 30 then draws no current as the tube is cut off. The purpose of this divider system will be clear considering that, normally, with tube 30 non-conductive, cathode 80 will assume a potential near that of its plate. An undue strain might thus be caused by voltage between the cathode 80 and its heater (not shown) if the heater is grounded, and a short might develop at this point. Resistors 93 and 92 also constitute a divider and the voltage at their junction added to the voltage developed at 88*a* by noise signal from grid 94 of tube 6 and with no signal on conductors 2 keep grid 54 at such a negative voltage that tube 58 is non-conductive with certainty. The adjustability of tap 88*a* makes available to the operator a certain amount of control in determining at what strength of signal the noise-developed voltage at 88*a*, added to the voltage at the junction between resistors 92 and 93, is sufficient to fire tube 58. In this connection, due regard must be had, of course, to the bias normally developed across resistor 68 when tube 56 is conducting. Tap 50*a* gives some adjustability by the operator in determining at what strength of noise signal tube 56 will fire, and cause the trip circuit to cut-off tube 58, thereby rendering tube 30 non-operative. Combination 48 preferably has a time constant large with respect to the period of the signals of radio frequency.

When tube 58 is conductive there is substantially no loss of sensitivity. It has been found that with proper adjustment the only signal strength necessary at conductors 2 to trip the circuit 56, 58 and cause conduction of tube 58 is a sufficient signal to override the noise. Moreover, during the periods when tube 58 is non-conductive no current flows from the power supply through tube 30, although current does flow through tube 56. This results in a considerable saving in power supply current, because the current drawn by tube 56 through resistor 76 is relatively small compared to the current drawn by tube 30 during operative periods of the latter. It will be obvious that when tube 58 is conductive the voltage drop across this tube is substantially constant because of the characteristics inherent in and peculiar to such tubes, as will be understood by those skilled in the art. Thus the fidelity of the output of tube 30 is not substantially adversely affected. The space discharge current of tube 30 may vary as required by the signal on its control grid 28. Hence, the use of a gas discharge tube in series with tube 30 is particularly desirable.

It will be obvious to one skilled in the art that the circuit of the invention is not necessarily limited in application to a frequency modulated receiver, but is applicable to receiver systems generally. In the embodiment illustrated by Fig. 1, values of various circuit constants and certain tube types have been indicated on the drawing to enable those skilled in the art to readily construct such a circuit. These values and tube types are, however, given as illustrative only.

Referring now to Fig. 2 in which like reference numerals designate the same components as those in Fig. 1, the circuit may comprise the same limiter stage and discriminator stage comprising the tubes 6, the tuned circuits 8, 10, the double diode 12, and the resistors 18 shown in Fig. 1. Tuned circuit 8 is connected as before to the junction between condenser 42 and resistor 44. Likewise, the first audio frequency stage comprising the tube 22 is substantially the same as in the circuit of Fig. 1 as are the connections therefrom to the tube 30 of the first audio frequency output stage. Therefore, the limiter discriminator and first audio frequency stages are omitted in Fig. 2, only enough being shown so that the proper connections thereto at arbitrarily designated terminals A and B are obvious. The principal difference between the circuit of Fig. 2 and the circuit of Fig. 1 is the inclusion of a frequency selective circuit comprising the double triode 100 and the twin T resistance bridge 102. Section 100*a* of double triode 100 has its grid 103 connected through condenser 104 to the plate of tube 22. The plate 105 of section 100*a* is connected through condenser 106 to one side of the bridge 102 and also through resistor 108 to the positive side of the power supply. A resistor 110 has one side connected to the grid 103 of section 100*a* and the other side connected to the parallel resistor-condenser combination 112, the other side of which is connected to cathode 113 of section 100*a*. The junction between resistor 110 and the combination 112 is connected to the plate 114 of the other section 100*b*, of double triode 100. The cathode 116 of section 100*b* is connected through parallel resistor-condenser combination 118 to ground. Grid 120 of section 100*b* is connected to the other side of the twin T bridge 102 which is connected through resistor 122 to ground. The junction between condenser 119 and resistor 121 (the trunks of the T or Y portions of the bridge) is grounded. The cathode of section 40*b* of tube 40 is connected through resistor 124 to control grid 84 of gas tube 58, and through a parallel resistor-condenser combination 126 to a supply of voltage negative with respect to ground. The plates of sections 40*a* and 40*b* are connected to ground through resistors 152 and 150, respectively.

In the operation of the embodiment of the invention illustrated in Fig. 2, tube 30 is connected to the voltage supply through the tube 58 so that when tube 58 is non-conductive there is no audio frequency output. In this respect, the embodiment conforms with that of Fig. 1. However, the frequency selective circuit comprising the double triode 100 and the twin T bridge 102 has a characteristic such that in the absence of signal on grid 103 of a frequency to which the twin T bridge 102 is tuned, the output from the selective tone control circuit is substantially zero, whereas in the presence of a tone control signal at grid 103 to which the twin T bridge 102 is tuned a signal is fed to section 40*b* of diode 40 through condenser 127, across resistor 150 connected from the plate of 40*b* to ground, thereby causing grid 84 to receive a positive bias overcoming the fixed negative bias indicated as applied thereto, and causing gas tube 58 to conduct to the exclusion of gas tube 56. This will occur because of the peculiar transmission characteristic of bridge 102. Signals are transmitted by the bridge at off-resonance frequencies and are fed to grid 120 of section 100*b* and the output of section 100*b* is fed to the cathode of 100*a* in order to effectively nullify the grid signal on grid 103 of section 100*a*. At the resonance point of the bridge 102 there is substantially no transmission therethrough and the feedback is greatly reduced or nullified. In the presence of the tone control signal on grid 103 without feedback through the bridge, a positive voltage is applied at grid 84 of tube 58 due to rectification in section 40*b* such that gas tube 58 is fired and conducts to the exclusion of gas tube 56, and tube 30 is thereby made operative. It will also be apparent that a signal of the selected frequency will reach grid 103 only if it reaches grid 20 of tube 22 and is a component of the frequency modulation of the frequency modulated carrier wave impressed on conductors 2. Even though the tone control frequency is not well outside the spectrum of the audio intelligence modulation impressed on the carrier, accidental response and the firing of tube 58 is avoided because the circuit including section 40*b* and combination 126 preferably has a time constant large with respect to a period of signals of the tone control frequency, which avoids immediate response to momentary peak audio frequencies which may fall in the response range of the selective amplifier circuit.

When the tone control signal is removed, after causing tube 58 to fire, but the radio frequency carrier signal sufficient to drive tube 6 to limiter values is continued, the circuit values are such that the trip circuit does not trip, but tube 58 continues to conduct. However, when such radio frequency signals are also removed, noise signals are fed through condenser 42 (as with the circuit of Fig. 1), to section 40*a* across resistor 152. These signals cause a positive voltage at grid 54 to fire tube 56, which then conducts to the exclusion of tube 58, and tube 30 is thereby cut-off from the direct current voltage supply.

In one embodiment of the invention utilizing the circuit illustrated by Fig. 2, the tone control circuit caused tube 58 to become conductive and the receiver operative with an applied tone signal modulating a carrier delivering only one-half micro-volt of radio frequency voltage at the antenna (not shown) of a receiver including the illustrated circuit; the receiver then remained in operation until radio frequency voltage at the antenna was reduced to under one-tenth of a micro-volt for a particular adjustment of tap 50a, when noise signal fed through condenser 42 across resistor 152 to section 40a developed sufficient voltage at grid 54 to fire tube 56 causing the receiver to become inoperative.

Referring now to Fig. 3, the final I. F. stage tube 200 of a receiver has a signal applied to its control grid 202. A portion of the output at plate 204 of tube 200 is fed through condenser 206 to the cathode of section 40a and the plate of section 40b (directly connected) of double diode 40. The receiver may be a frequency modulation receiver and the detector 208 may be a ratio detector of the type shown on page 36 of the RCA Receiving Tube Manual, 1947 edition, or it may be the conventional detector of an amplitude modulation receiver. Detector 208 receives the I. F. signal by coupling with tuned circuit 210 connected to plate 204. The output of detector 208 is fed to an audio-frequency amplifier 211, the output of which is fed to an audio-frequency output stage comprising, as in previously described embodiments, tube 30. The same trip circuit as previously illustrated comprising tubes 56 and 58, with the latter connected serially with tube 30 and the power supply, is controlled by the voltages derived by the circuit portion comprising tube 40. With the connections shown, it will be understood that with a signal received at grid 202, the voltage at tap 212 of resistor 214 is added to the negative voltage applied to resistor 214 as indicated, and is fed through resistor 216 to grid 84 of tube 58 and to trip the circuit of tubes 56 and 58 so that tube 58 conducts to the exclusion of tube 56; and simultaneously tap 218 of resistor 220 has a negative voltage which is fed through resistor 222 to grid 54 to further assure non-conduction of tube 56 during signal reception. When the signal at grid 202 is removed, assuming appropriate plate voltage at tube 56, tube 56 will fire, because the voltage at grid 54 becomes more positive and that at grid 84 becomes negative. If necessary, a small positive voltage may be connected to resistor 220, as shown, which will assure conduction under this condition, and which is overcome at grid 54 when diode 40 is actuated by signals from condenser 206. Condensers 223 and 224 serve to maintain the desired D.-C. voltages across resistors 214 and 218 respectively between conduction periods of tube 40. In view of what has been written hereinbefore, the operation of the circuit of Fig. 3 will be clear to those skilled in the art.

Referring now to Fig. 4, a receiver is shown with an antenna 300, radio frequency amplifier, mixer and intermediate frequency amplifier stages 302 is connected to feed detector 304, which, in turn, feeds an audio frequency amplifier 306. Audio frequency amplifier 306 feeds both a frequency selective circuit 308 and the audio frequency output amplifier 310. An electrode of a discharge device of circuit 312, an output electrode of amplifier 310, and the direct current voltage power supply 313 are serially connected.

I have found that the trip circuit of Figs. 1, 2, and 3 is peculiarly well suited to the purpose of my invention. However, this trip circuit is not the only one which may be used. Generally, circuits having two operating conditions in which one electrode of a discharge device is conductive to the exclusion of another electrode of a discharge device, or vice-versa, depending on the voltages applied to the discharge device or devices are intended to be included as trip circuits. Moreover, I prefer to use the frequency selective circuit specifically illustrated in Fig. 2 because it is highly selective compared to other frequency selective circuits of like simplicity. However, it is obvious that other frequency selective circuits may be employed.

A double diode 40 has the plates of sections 40a and 40b thereof capacitively coupled by condensers 314 and 316 to stages 302 and to the frequency selective circuit 308 respectively. The latter circuit feeds a signal through condenser 316 only in the presence of a selected frequency or frequencies in the output of amplifier 306. Resistors 315 and 317 are respectively connected from the plates of sections 40a and 40b to ground. The voltages on the resistor condenser combinations 318 and 320 respectively control trip circuit 312. Upon the presence of a tone control signal at amplifier 306, trip circuit 312 is tripped and the output stage 310 is made operative and remains so as long as a signal is received at the output of amplifier 302. Then, in the absence of a signal at 302, circuit 312 is tripped again to make A. F. stage 310 inoperative. The double diode circuit and connections here illustrated have been chosen to actuate the trip circuits of tubes 56 and 58 heretofore illustrated. Thus the connection from combination 318 may lead to grid 84 and that from combination 320 to grid 54. It should, however, be understood that other means may be used to derive the desired control voltage or voltages, the control voltage derivation circuit being specifically illustrated herein for convenience and rarity although it, too, could be illustrated as a block in this diagram.

It will be apparent that my invention is subject to many modifications and changes without departing from the spirit and scope of the invention as defined in the appended claims.

What is claimed is:

1. An electrical circuit comprising a source of signal voltage, an amplifier stage having a first space discharge device provided with control means connected to said signal source, a direct current voltage supply circuit for said first space discharge device, a trip circuit comprising second and third space discharge devices having corresponding space current conducting electrodes, means interconnecting said corresponding electrodes and operative to render either one of said space discharge devices conductive to the exclusion of the other, said direct current voltage supply circuit, said first space discharge device and one of said space current conducting electrodes being serially connected, a first means connected to said signal voltage source to derive a positive control voltage representative of random signals, a second means connected to said source to derive a negative control voltage representative of said random signals, a first conductive circuit connected between said first means and said third discharge device to render said third discharge device conductive in the presence of said random signal voltages, and a second conductive circuit connected between said second means and said second discharge device to maintain said second discharge device non-conductive in the presence of said random signals.

2. The electrical circuit claimed in claim 1, said control voltage derivation means each comprise a rectifying element, said rectifying elements being connected in opposite polarity to said signal voltage source.

3. An electrical circuit comprising a source of signal voltage, an amplifier stage having a first space discharge device provided with control means connected to said signal source, a direct current voltage supply circuit for said space discharge device, a voltage responsive trip circuit comprising second and third discharge devices having mutual biasing means and being intercoupled so that either of said second and third devices is conductive to the exclusion of the other, said direct current voltage supply circuit, and said first and second space discharge devices being serially connected, a first means connected to said signal voltage source to derive a positive control voltage representative of random signals, a second means connected to said source to drive a negative control voltage representative of said random signals, a first electrical circuit connected between said first means and said third discharge device to render said third discharge device conductive in the presence of said random signal voltages, and a second electrical circuit connected between said second means and said second discharge to maintain said second discharge device non-conductive in the presence of said random signals.

4. The electrical circuit claimed in claim 3, said second discharge device being a gas discharge tube.

5. The electrical circuit claimed in claim 3, said second and third discharge devices being gas discharge tubes.

6. The electrical circuit claimed in claim 3, said control voltage deriving means comprising a rectifying element.

7. In a receiver having means to receive modulated radio frequency signals at a desired frequency and means to demodulate said signals to produce an audio frequency signal, an audio frequency amplifier tube having a plate, a grid connected to receive said audio frequency signals, two thyratron tubes each provided with an input circuit and an output circuit and connected in a trip circuit, means interconnecting said input and output circuits and operative to render either one of said thyratron tubes conductive to the exclusion of the other, a direct current voltage supply circuit connected in series with said amplifier tube plate and cathode and with one of said thyratron tubes, means including a pair of rectifying elements connected in opposed relation to said receiving means to derive a control voltage representative of the reception or absence of radio frequency signals of said desired frequency, circuit means connected between one of said rectifying elements and one of said two thyratron tubes to apply said control voltage to said one of said two thyratron tubes to cause said one thyratron tube on reception of said signals of desired frequency to conduct to the exclusion of the other of said thyratron tubes, and further circuit means connected between the other of said rectifying elements and the other of said thyratron tubes to apply said control voltage to said other thyratron tube to cause said other thyratron tube in the absence of said signals to conduct to the exclusion of said one thyratron tube.

8. A receiver circuit comprising a source of audio frequency signals, an audio frequency amplifier tube having a plate, a cathode, and a control grid connected to said source, two thyratron tubes each provided with an input circuit and an output circuit and connected in a trip circuit, means interconnecting said input and output circuits and operative to render either one of said thyratron tubes conductive to the exclusion of the other, a direct current voltage supply circuit connected in series with said amplifier tube plate and cathode and with one of said thyratron tubes, frequency selective means connected to said source to derive a control voltage in response to a tone control signal component of predetermined audio frequency in said audio frequency signals, circuit means connected between said frequency selective means and said one of said thyratron tubes to apply said control voltage to said one of said thyratron tubes to cause said one thyratron tube in the presence of said tone control signal to conduct to the exclusion of the other of said thyratron tubes circuit means including a rectifying element coupled to said source to derive a control voltage in response to noise voltages, and an electrical connection between said rectifying element and the other of said thyratron tubes to cause said other thyratron tube to conduct in the presence of noise signals to the exclusion of said one thyratron tube.

9. In a receiver having a receiving circuit to receive a frequency modulated radio frequency signal at a desired central frequency and a demodulation circuit connected thereto to demodulate said signals to produce an audio-frequency signal, the combination comprising an audio-frequency amplifier tube connected to the demodulation circuit to amplify said audio-frequency signals, two gas tubes each provided with an input circuit and an output circuit and connected in a trip circuit, means interconnecting said input and output circuits and operative to render either one of said gas tubes conductive to the exclusion of the other, a direct current voltage supply circuit, said amplifier tube, said direct current voltage supply circuit and one of said gas tubes being serially connected, a first voltage derivation circuit connected to said receiving circuit to derive a direct current control voltage on reception of said frequency modulated radio frequency signals, circuit means connected between said voltage derivation circuit and said one gas tube to apply said control voltage to said one gas tube to cause said one gas tube to conduct to the exclusion of the other of said gas tubes a second voltage derivation circuit including a rectifying element coupled to said receiving circuit to derive a second direct current control voltage on the reception of random radio frequency signals, and a connection between said rectifying element and said other gas tube to apply said second control voltage to said other tube to cause said other gas tube to conduct to the exclusion of said one of said gas tubes on the reception of said random signals.

10. The combination claimed in claim 9, said first voltage derivation circuit comprising a rectifying circuit having a time constant large compared to a period of said radio frequency signal of said central frequency.

11. An electrical circuit comprising a source of signal voltage, an amplifier stage having a first space discharge device provided with control means connected to said signal source, a direct current voltage supply circuit for said first space discharge device, a trip circuit comprising second and third space discharge devices having corresponding space current conducting electrodes, means interconnecting said corresponding electrodes and operative to render either one of said electrodes conductive to the exclusion of the other, said direct current voltage supply circuit, said first space discharge device and one of said space current conducting electrodes being serially connected, a frequency selective circuit connected to said signal source to transmit signals in response to a selected frequency, a first control voltage derivation circuit connected to said frequency selective circuit to derive a direct current control voltage and connected to apply said derived control voltage to said one of said space current conducting electrodes, a second voltage derivation circuit including a rectifying element connected to said source of signal voltage to derive a second control voltage representative of noise energy, and circuit means connected between said rectifying element and said other space current conducting electrode.

12. A receiver circuit comprising a source of modulated radio frequency signals, a demodulation circuit connected thereto to demodulate said signals to produce an audio frequency signal, an audio frequency amplifier tube connected to receive said audio frequency signals, a direct current voltage supply circuit for said tube, a trip circuit comprising a discharge device and a voltage responsive control circuit to render said discharge device selectively conductive and nonconductive, said direct current voltage supply circuit, said discharge device, and said tube being serially connected, a frequency selective circuit connected to said demodulation circuit to select a desired component of said audio frequency signals of a desired tone control frequency, a first voltage derivation circuit connected to said frequency selective circuit to derive a first direct current control voltage, a second voltage derivation circuit connected to said source of radio frequency signals to derive a second direct current control voltage, and means including electrical connections between said voltage derivation circuits and said trip circuit to cause said discharge device to become conductive in the presence of an audio frequency signal selected by said frequency selective circuit thereby to apply direct current voltage from said supply circuit to said tube and to cause said discharge device thereafter to remain conductive in the presence of said radio frequency signal.

13. The circuit claimed in claim 12, said trip circuit comprising a second discharge device connected with one said discharge device conductive to the exclusion of the other.

14. The circuit claimed in claim 13, said discharge devices being gas discharge devices.

15. The circuit claimed in claim 12 each said voltage derivation circuit comprising a rectifying element.

16. The circuit claimed in claim 12, said first voltage derivation circuit comprising a rectifying circuit having a time constant large compared to a period of signals at said tone control frequency, said second voltage derivation circuit having a time constant large compared to a period of the signal of the central frequency of said radio frequency signals.

GEORGE D. HANCHETT, JR.

REFERENCES CITED

The following references are of record in the file of this patent:

UNITED STATES PATENTS

| Number | Name | Date |
|---|---|---|
| 2,028,859 | Barton | Jan. 28, 1936 |
| 2,112,686 | Barton | Mar. 29, 1938 |
| 2,207,571 | Andrews | July 9, 1940 |
| 2,253,832 | Whitaker | Aug. 26, 1941 |
| 2,265,868 | Schonland | Dec. 9, 1941 |
| 2,381,754 | Jadraque | Aug. 7, 1945 |
| 2,400,948 | Peterson | May 28, 1946 |
| 2,479,305 | Brown | Aug. 16, 1949 |